Patented Oct. 19, 1948

2,451,478

UNITED STATES PATENT OFFICE 2,451,478

AMINOANTHRAQUINONE DYE COMPOUNDS CONTAINING A TRIFLUOROMETHYL GROUP

Joseph B. Dickey and Edmund B. Towne, Rochester, N. Y., assignors to Eastman Kodak Company, Rochester, N. Y., a corporation of New Jersey No Drawing. Application September 10, 1946, Serial No. 696,030

5 Claims. (Cl. 260—379)

1

This invention relates to new anthraquinone compounds and their application to the art of dyeing or coloring textile materials, such as filaments, threads, yarns or fabrics (knitted or woven) comprising a cellulose carboxylic ester.

We have discovered that the anthraquinone compounds having the formula:

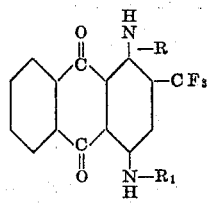

wherein R and R₁ each represents a member selected from the group consisting of a hydrogen atom and a non-cyclic aliphatic group containing 1 to 6 carbon atoms and wherein said aliphatic group is composed only of atoms selected from the group consisting of carbon, hydrogen and oxygen atoms, are valuable dyes for coloring textile materials comprising cellulose carboxylic ester fibers, in which ester the acid radical contains from 2 to 4 carbon atoms. They are especially useful for the coloration of cellulose acetate textile materials.

It is an object of our invention to provide new anthraquinone dye compounds. Another object is to provide a satisfactory process for the preparation of the new anthraquinone dye compounds of the invention. A further object is to provide dyed cellulose carboxylic ester materials which possess superior fastness to light and gas.

Our new anthraquinone dye compounds color the aforesaid textile materials reddish-violet, violet, blue and greenish-blue shades. The new dye compounds of our invention also possess some utility for the coloration of wool and silk yielding reddish-violet, violet, blue and greenish blue shades, for example, on these materials. They are, however, primarily adapted for the coloration of the cellulose carboxylic ester textile materials previously indicated.

2

The anthraquinone compounds of our invention are prepared by varying methods depending upon the particular structure involved. Thus compounds having the formula:

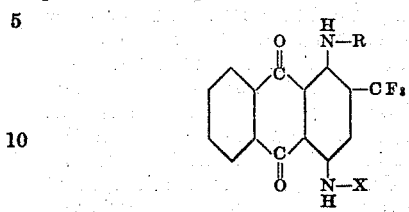

wherein R has the meaning previously assigned to it and X represents a non-cyclic aliphatic group containing 1 to 6 carbon atoms and wherein said aliphatic group is composed only of atoms selected from the group consisting of carbon, hydrogen and oxygen atoms can be prepared by reacting a compound having the formula:

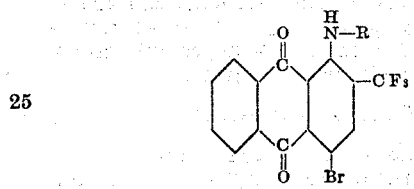

wherein R has the meaning previously assigned to it with a noncyclic aliphaticamine containing 1 to 6 carbon atoms and wherein said aliphaticamine, except for the NH₂ portion thereof, is composed only of atoms selected from the group consisting of carbon, hydrogen and oxygen atoms.

Similarly, compounds having the formula:

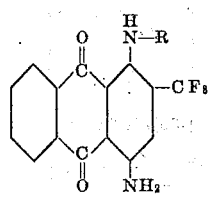

wherein R has the meaning previously assigned to it can be prepared by reacting a compound having the formula:

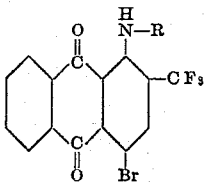

wherein R has the meaning previously assigned to it with ammonia. The ammonia is conveniently in the form of ammonium hydroxide.

Normally the reactions just referred to are carried out in the presence of a copper salt catalyst although in some instances the presence of a catalyst is not necessary. So far as we are aware almost any cupric salt is useful as a catalyst. Thus cupric sulfate (either with or without water of crystallization), cupric acetate, cupric bromide, cupric chloride and cupric iodide can be used. The use of copper sulfate and cupric acetate is preferred.

In many instances the reactions proceed better if a so-called acid binding agent is employed. In those cases where such an agent is desirable we have found that potassium acetate is ordinarily the best such agent to use. Where an acid binding agent is desirable other acid binding agents such as sodium acetate, sodium carbonate and potassium carbonate can ordinarily be employed. We say ordinarily because in some instances, for reasons unknown to us, the use of an acid binding agent other than potassium acetate has little or no effect. No instances have been noted by us wherein the use of potassium acetate is not satisfactory. This last observation appears true whether an acid binding agent is needed or not.

Aliphatic groups that can be present in the compounds of our invention include, for example, alkyl groups, hydroxyalkyl groups, alkoxyalkyl groups, monohydroxyalkoxy groups, carbalkoxyalkyl groups and unsaturated aliphatic hydrocarbon groups.

Illustrative alkyl groups include, for example, the methyl group, the ethyl group, the n-propyl group, the isopropyl group, the n-butyl group, the n-amyl group and the n-hexyl group. Illustrative alkoxyalkyl groups include, for example, the β-methoxyethyl group, the β-ethoxyethyl group, the β-(n-propoxy)ethyl group, the β-(n-butoxy)-ethyl group, the γ-methoxy-(n-propyl) group, the β-(β-methoxyethoxy)ethyl group

[—CH₂CH₂OCH₂CH₂OCH₃]

and the β-(β-ethoxyethoxy)ethyl group.

Illustrative of the hydroxyalkyl groups that can be present in the anthraquinone compounds of our invention are, for example, the β-hydroxyethyl group, the β-hydroxypropyl group, the γ-hydroxypropyl group, and the β,γ-dihydroxypropyl group. Other hydroxyalkyl groups such as the 4-hydroxybutyl group, the 5-hydroxyamyl group, the methylolethyl group

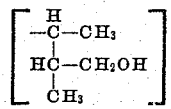

the 1-methylol-n-propyl group

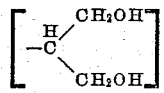

the 3-methylolbutyl group

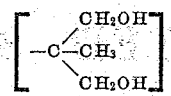

the dimethylolmethyl group

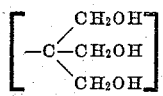

the dimethylolethyl group

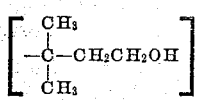

the trimethylolmethyl group

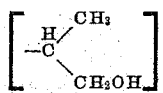

and the 2-ethylolpropyl group

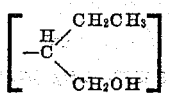

group can be present but these groups are seldom used in practice.

β-(β-hydroxyethoxy)ethyl

[—CH₂CH₂OCH₂CH₂OH]

β-[β-(β-hydroxyethoxy)ethoxy]ethyl

[—CH₂CH₂OCH₂CH₂OCH₂CH₂OH]

γ-(γ-hydroxypropoxy)propyl

[—CH₂CH₂CH₂OCH₂CH₂CH₂OH]

and β-(β-hydroxypropoxy)propyl

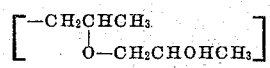

are illustrative of the monohydroxy-alkoxyalkyl groups that can be present in the anthraquinone compounds of our invention.

Illustrative unsaturated aliphatic hydrocarbon groups include, for example, vinyl(—CH=CH₂), allyl (—CH₂CH=CH₂) and crotonyl (—CH₂—CH=CH—CH₃)

β-carbmethoxyethyl and β-carbethoxyethyl are illustrative of carbalkoxyalkyl groups.

The following examples in which parts are by weight illustrate the anthraquinone dye compounds of our invention and their manner of preparation.

*Example 1*

50 parts of 1-amino-2-trifluoromethyl-4-bromoanthraquinone, 25 parts of potassium acetate, 30.8 parts of p-toluenesulfonamide, 0.6 part of cupric acetate and 405 parts of n-butyl alcohol are refluxed together for 24 hours. The reaction mixture is then cooled and the 1-amino-2-trifluoromethyl - 4 - (p -toluene-sulfonamido) anthraquinone formed in the reaction is recovered in the form of crystals by filtration, washed well with water and dried. The yield obtained is nearly quantitative.

50 parts of 1-amino-2-trifluoromethyl-4-(p-toluene-sulfonamido) anthraquinone are dissolved in 457 parts of sulfuric acid (sp. gr. 1.83) and heated on a steam bath for 3–4 hours. The reaction mixture, preferably after cooling, is then poured into cold water. The 1,4-diamino-2-trifluoromethylanthraquinone formed in the reaction is recovered by filtration, washed well with water and dried. It colors cellulose acetate textile materials violet shades.

25 parts of soda ash can be substituted for the potassium acetate used in the example just given.

Example 2

4 parts of 1-amino-2-trifluoromethyl-4-bromoanthraquinone, 1.2 parts of potassium acetate and 0.1 part of cupric sulfate are heated with stirring with 10 parts of ethanolamine at 140° C. In a short time the reaction mixture begins to turn blue indicating reaction. When the reaction is complete (about 4 hours) the reaction mixture is cooled. 1-amino-2-trifluoromethyl-4-β-hydroxyethylaminoanthraquinone crystallizes out and is recovered by filtration, washed well with water and dried. It colors cellulose acetate textile materials blue shades possessing good gas-fastness and excellent light-fastness properties.

Example 3

4 parts of 1-amino-2-trifluoromethyl-4-bromoanthraquinone, 1.2 parts of potassium acetate, 0.1 part of cupric sulfate and 5 parts of a 25 per cent aqueous methylamine solution are reacted together with stirring in 25 parts of pyridine at 140° C. Upon completion of the reaction the reaction mixture is cooled and crystals of 1-amino-2 - trifluoromethyl-4-methylaminoanthraquinone are recovered by filtration, washed well with water and dried. It colors cellulose acetate textile materials blue shades possessing good gas-fastness and excellent light-fastness properties.

Example 4

4 parts of 1-methylamino-2-trifluoromethyl-4-bromoanthraquinone, 1.2 parts of potassium acetate, 0.1 part of cupric sulfate (blue vitriol) and 4 parts of ethanolamine are heated with stirring at 140° C. until the reaction which takes place is complete. Upon completion of the reaction the reaction mixture is cooled and 1-methylamino-2-trifluoromethyl - 4-β-hydroxyethylaminoanthraquinone is recovered by filtration, washed well with water and dried. It colors cellulose acetate textile materials greenish-blue shades which possess good gas-fastness and excellent light-fastness properties.

Example 5

4 parts of 1-amino-2-trifluoromethyl-4-bromoanthraquinone, 1.2 parts of potassium acetate and 0.1 part of cupric acetate are heated with stirring with 8 parts of allylamine at 140° C. In a short time the reaction mixture begins to turn blue indicating reaction. When the reaction is complete (about 4 hours) the reaction mixture is cooled and the 1-amino-2-trifluoromethyl-4-allylaminoanthraquinone formed in the reaction is recovered by filtration, washed well with water and dried. It colors cellulose acetate textile materials blue shades.

Example 6

4 parts of 1-amino-2-trifluoromethyl-4-bromoanthraquinone, 1.2 parts of potassium acetate and 0.1 part of cupric sulfate (CuSO₄) are heated with 10 parts of β-methoxyethylamine at 140° C. Upon completion of the reaction which takes place (about 4 hours) the reaction mixture is poured into water. 1-amino-2-trifluoromethyl-4-methoxyethylaminoanthraquinone is recovered by filtration, washed well with water and dried. It colors cellulose acetate textile materials blue shades with a reddish cast.

Example 7

4 parts of 1-methylamino-2-trifluoromethyl-4-bromoanthraquinone, 1.2 parts of potassium acetate, 0.1 part of cupric acetate and 7 parts of β-carbmethoxyethylamine

are refluxed together with stirring in 25 parts of n-amyl alcohol. Upon completion of the reaction which takes place (4–6 hours) the reaction mixture is cooled and then poured into water. 1-methylamino-2-trifluoromethyl-4-carbmethoxyethylaminoanthraquinone precipitates and is recovered by filtration, washed well with water and dried. It colors cellulose acetate textile materials blue shades with a greenish cast.

Example 8

4 parts of 1-β-hydroxyethylamino-2-trifluoromethyl-4-bromoanthraquinone, 1.2 parts of potassium acetate, 0.1 part of cupric acetate and 6 parts of β-methoxyethylamine are refluxed together with stirring in 25 parts of n-butyl alcohol. Upon completion of the reaction which takes place (4–6 hours) the reaction mixture is cooled and then poured into water. 1-β-hydroxyethylamino - 2-trifluoromethyl-4-methoxyethylaminoanthraquinone precipitates and is recovered by filtration, washed well with water and dried. It colors cellulose acetate textile materials blue shades with a greenish cast.

Example 9

5 parts of 1-amino-2-trifluoromethyl-4-bromoanthraquinone, 1.4 parts of potassium acetate, 0.1 part of copper sulfate (blue vitriol) and 2 parts of ethylamine are placed in 25 parts of n-amyl alcohol and the reaction mixture is heated in an autoclave at 120° C. for 6 hours. The reaction mixture is then cooled to 75° C., filtered and ⅓ of the n-alcohol is removed by distillation. The remainder of the reaction mixture is then cooled. 1-amino-2-trifluoromethyl-4-ethylaminoanthraquinone crystallizes out and is recovered by filtration, washed well with water and dried. It colors cellulose acetate bluish-violet shades.

Example 10

4 parts of 1-amino-2-trifluoromethyl-4-bromoanthraquinone, 1.2 parts of potassium acetate and 0.1 part of cupric acetate are heated with 14 parts of β-(β-hydroxyethoxy)ethylamine at 140° C. Upon completion of the reaction which takes place (about 4 hours) the reaction mixture is poured into water. 1-amino-2-trifluoro-methyl-4-β-(β-hydroxyethoxy) ethylaminoanthraquinone is recovered by filtration, washed well with water and dried. It colors cellulose acetate textile materials blue shades with a reddish cast.

Example 11

4 parts of 1-amino-2-trifluoromethyl-4-bromoanthraquinone, 1.2 parts of potassium acetate and 0.1 part of cupric acetate and 5 parts of a 25 per cent aqueous ammonium hydroxide solution are reacted together in a suitable reaction vessel with stirring at about 140° C. Upon completion of the reaction (about 4 hours) the reaction mixture is cooled and 1,4- diamino-2-trifluoromethylanthraquinone is recovered by filtration, washed well with water and dried. It colors cellulose acetate textile materials violet shades.

By the use of an equivalent molecular weight of a 1-aliphaticamino-2-trifluoromethyl-4-bromonanthraquinone for 1-amino-2-trifluoromethyl-4-bromoanthraquinone in the foregoing example 1-aliphaticamino - 2-trifluoromethyl - 4-aminoanthraquinone compounds can be prepared. Thus 1-methylamino-2-trifluoromethyl-4-amino-anthraquinone, 1-β-hydroxyethylamino - 2-trifluoromethyl - 4 - amino-anthraquinone and 1-β,γ - dihydroxypropylamino - 2-trifluoromethyl-4-aminoanthraquinone, for example, can be so prepared.

Following the procedures described in Examples 1 to 11, inclusive, the dye compounds tabulated hereinafter can be readily prepared.

*Dye compound*

(1) 1-amino-2-trifluoromethyl-4-β-hydroxypropylaminoanthraquinone
(2) 1-amino-2-trifluoromethyl-4-β,γ-dihydroxypropylaminoanthraquinone
(3) 1-amino-2-trifluoromethyl - 4 - ethylaminoanthraquinone
(4) 1-amino - 2 - trifluoromethyl-4-n-hexylaminoanthraquinone
(5) 1-amino-2-trifluoromethyl-4-β-(β-hydroxyethoxyl) ethylaminoanthraquinone
(6) 1-methylamino-2-trifluoromethyl - 4 - ethylaminoanthraquinone
(7) 1 - methylamino-2-trifluoromethyl - 4 - isopropylaminoanthraquinone
(8) 1-methylamino-2-trifluoromethyl-4- β -hydroxypropylaminoanthraquinone
(9) 1-methylamino - 2 - trifluoromethyl - 4 - γ - hydroxypropylaminoanthraquinone
(10) 1-methylamino - 2 - trifluoromethyl-4-β,γ-dihydroxypropylaminoanthraquinone
(11) 1-methylamino - 2 - trifluoromethyl - 4 - β-methoxyethylaminoanthraquinone
(12) 1 - methylamino-2-trifluoromethyl-4-β-hydroxy-β-ethoxyethylaminoanthraquinone
(13) 1-ethylamino-2-trifluoromethyl - 4 - β-hydroxyethylaminoanthraquinone
(14) 1-ethylamino - 2 - trifluoromethyl-4-β-hydroxy-β-ethoxyethylaminoanthraquinone
(15) 1 - n - proylamino-2-trifluoromethyl-4-β,γ-dihydroxypropylaminoanthraquinone
(16) 1-n-butylamino - 2 - trifluoromethyl-4-β-hydroxyethylaminoanthraquinone
(17) 1-β-methoxyethylamino - 2 - trifluoromethyl-4-methylaminoanthraquinone
(18) 1-β-hydroxyethylamino -2- trifluoromethyl-4-methylaminoanthraquinone
(19) 1 -β- hydroxyethylamino-2-trifluoromethyl-4-ethylaminoanthraquinone
(20) 1-β-hydroxyethylamino - 2 - trifluoromethyl-4-β-hydroxyethylaminoanthraquinone
(21) 1 - β - hydroxyethylamino-2-trifluoromethyl-4-β-hydroxy - β - ethoxyethylaminoanthraquinone
(22) 1-β-hydroxyethylamino -2- trifluoromethyl-4-γ-ketobutylaminoanthraquinone
(23) 1-n-amylamino - 2 - trifluoromethyl - 4 - β-hydroxyethylaminoanthraquinone
(24) 1-β-hydroxypropylamino- 2 -trifluoromethyl-4-β-ethoxyethylaminoanthraquinone Compounds 1 to 5 color cellulose acetate textile materials blue with a reddish cast. Compounds 6 to 24 color cellulose acetate textile materials blue with a greenish cast.

As seen from the examples the aliphatic groups which can be present in the compounds of our invention can be introduced by use of the primary aliphaticamine corresponding to the aliphatic group to be introduced. To illustrate, the methyl group, the β-hydroxyethyl group and the dimethylolmethyl group, for example, can be introduced by means of methylamine, β-hydroxyethylamine and dimethylolmethylamine, respectively.

In order that the preparation of the anthraquinone compounds of our invention will be entirely clear the preparation of various intermediate compounds used in their manufacture is described hereinafter.

A. *1-amino-2-trifluoromethyl-4-bromoanthraquinone*

146 grams of 1-amino-2-trifluoromethylanthraquinone are dissolved in 250 grams of sulfuric acid (sp. gr. 1.84) at about 50° C.–60° C. The resulting solution is poured with good stirring into 3.5 liters of water containing 5 grams of ferrous sulfate. To this mixture is then added with vigorous stirring 88 grams of bromine over a period of 4 hours at 55° C.–60° C. and the reaction mixture is stirred for about 5 hours after the addition of the bromine. By the use of a light positive pressure the time needed for bromination can be reduced. 1-amino-2-trifluoromethyl-4-bromoanthraquinone is recovered by filtration as an orange red solid. It is washed well and dried. The yield obtained is nearly quantitative.

B. *1-β-hydroxyethylamino-2-trifluoromethylanthraquinone*

30.7 parts of 1-chloro-2-trifluoromethylanthraquinone, 250 parts of pyridine and 15 parts of ethanolamine in 20 parts of water are mixed and heated together in a shaking autoclave for 6 hours at 140° C. The reaction mixture is removed from the autoclave when at about a temperature of 75° C. and allowed to cool. Upon cooling 1-β-hydroxyethylamino - 2 - trifluoromethylanthraquinone crystallizes out and is recovered by filtration, washed well with water and dried. It is a reddish-brown solid that colors cellulose acetate textile materials red shades from an aqueous suspension. The yield is about 95 per cent.

It will be understood that by the use of an equivalent molecular weight of another aliphaticamine in place of ethanolamine other 1-aliphaticamino- 2 -trifluoromethylanthraquinone compounds can be obtained. Thus by the use of methylamine and ethylamine, respectively, 1-methylamino - 2 - trifluoromethylanthraquinone and 1-ethylamino - 2 - trifluoromethylanthraquinone, respectively, are obtained. Similarly by the use of ammonium hydroxide 1-amino-2-trifluoromethylanthraquinone is obtained.

C. *1-methylamino-2-trifluoromethylanthraquinone*

25.6 grams of 1-nitro-2-trifluoromethylanthraquinone, 500 cc. of ethanol and 50 cc. of a 25 per cent aqueous solution of methylamine are added to a suitable reaction vessel and the reaction mixture resulting is heated to boiling and maintained under these conditions until the reaction is complete. The color of the reaction mixture rapidly changes to red. Upon completion of the reaction (about 4 to 6 hours) the reaction mixture is cooled. 1-methylamino-2 - trifluoromethylanthraquinone crystallizes out on cooling and is recovered by filtration, washed well with water and purified by recrystallization from ethyl alcohol. Purification can also be effected by crystallization from a solvent such as n-butyl alcohol, pyridine, acetic acid and nitrobenzene. 1-methylamino-2-trifluoromethylanthraquinone dyes cellulose acetate textile materials red shades.

By the use of an equivalent molecular weight of another aliphaticamine in place of methylamine other 1-aliphaticamino-2-trifluoromethylanthraquinone compounds can be obtained. Thus by the use of β-hydroxyethylamine and n-butylamine, respectively, 1-β-hydroxyethylamino-2-trifluoromethylanthraquinone and 1-n- butylamino - 2 - trifluoromethylanthraquinone, respectively, are obtained.

D. *1-methylamino-2-trifluoromethyl-4-bromoanthraquinone*

25 parts of 1-methylamino-2-trifluoromethlanthraquinone are dissolved in 149 parts of pyridine and brominated at 100° C. with bromine (5-10 per cent excess over the amount theoretically required) for 5 to 6 hours. The reaction mixture is then cooled. The 1-methylamino-2-trifluoromethyl-4-bromoanthraquinone formed in the reaction crystallizes out and is recovered by filtration. It can be used as obtained or obtained in purer form by recrystallization from pyridine.

By the use of an equivalent molecular weight of another 1-aliphaticamino-2-trifluoromethylanthraquinone for 1-methylamino-2-trifluoromethylanthraquinone in the foregoing example other 1-aliphaticamino-2-trifluoromethyl-4-bromoanthraquinone compounds can be readily prepared.

Insofar as the dyeing of cellulose acetate textile materials is concerned when the member R is an alkyl group we prefer that it be a primary alkyl group containing 1 to 4, inclusive, carbon atoms. Similarly when R is a hydroxyalkyl group we prefer that it contain 2 or 3 carbon atoms. Generally speaking the use of aliphatic groups not containing more than 4 carbon atoms is preferred.

From the examples given it will be apparent that the reactions used to prepare our dye compounds can be carried out either with or without a solvent medium. Where a solvent medium is desirable n-amyl alcohol, n-butyl alcohol, ethyl alcohol and pyridine, for example, can be employed. Where it is desired to obtain the dye compound in a highly purified form this can be accomplished by one or more crystallizations from a solvent such as pyridine, n-amyl alcohol, n-butyl alcohol, acetic acid and nitrobenzene, for example. Both the use of solvent mediums and the use of solvents for purification purposes are well known to those skilled in the art and need not be elaborated upon.

The anthraquinone dye compounds of our invention are primarily adapted for the coloration of cellulose carboxylic ester textile materials in which ester the acid radical contains from 2 to 4 carbon atoms. These esters include the hydrolyzed as well as the unhydrolyzed cellulose carboxylic esters such as cellulose acetate, cellulose propionate and cellulose butyrate and the hydrolyzed as well as the unhydrolyzed mixed carboxylic esters of cellulose, such as cellulose acetate-propionate and cellulose acetate-butyrate. Our new dye compounds are also useful for the coloration of cellulose ester and cellulose ether lacquers, as well as lacquers made from polyvinyl compounds. Our new dyes are of some use for the coloration of nylon textile materials as well as wool and silk textile materials.

The anthraquinone dye compounds of our invention may be advantageously directly applied to the material undergoing coloration in the form of an aqueous suspension which can be prepared by grinding the dye to a paste in the presence of a sulfonated oil, soap or other suitable dispersing agent and dispersing the resulting paste in water.

Direct dyeing operations can, with advantage, be conducted at temperatures of about 65–90° C. but any suitable temperature can be used. Thus the textile material to be dyed or colored is ordinarily added to the dye bath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. The amount of dye used can be, for example, ⅓ to 3% (by weight) of that of the textile material, although lesser or greater amounts of dye can be used.

We claim:

1. The anthraquinone dye compounds having the formula:

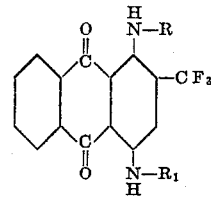

wherein R and $R_1$ each represents a member selected from the group consisting of a hydrogen atom, a primary alkyl group having 1 to 6 carbon atoms, an alkoxyalkyl group having 3 to 6 carbon atoms, a hydroxyalkyl group having 2 to 5 carbon atoms, a monohydroxyalkoxyalkyl group having 4 to 6 carbon atoms, an unsaturated aliphatic hydrocarbon radical having 2 to 4 carbon atoms and whose unsaturation consists of a single double bond, an isopropyl group, a $$-CH_2CH_2COOCH_3$$

group, a 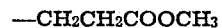 group and a

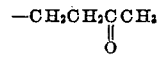

group and wherein said alkyl, alkoxyalkyl, hydroxyalkyl, monohydroxyalkoxyalkyl and unsaturated aliphatic hydrocarbon groups are non-cyclic and are composed only of atoms selected from the group consisting of carbon, hydrogen and oxygen atoms.

2. The anthraquinone dye compounds having the formula:

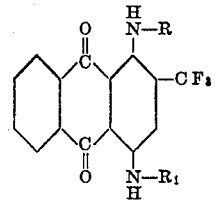

wherein R and $R_1$ each represents a primary alkyl group having 1 to 4 carbon atoms.

3. The anthraquinone dye compounds having the formula:

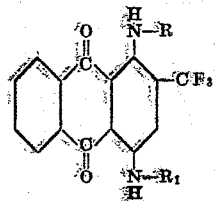

wherein R represents a primary alkyl group having 1 to 4 carbon atoms and $R_1$ represents a hydroxyalkyl group containing 2 to 3 carbon atoms and wherein there is no hydroxy group on the carbon atom of said hydroxyalkyl group which is attached to the nitrogen atom shown.

4. The anthraquinone dye compounds having the formula:

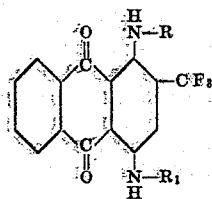

wherein R and $R_1$ each represents a hydroxyalkyl group containing 2 to 3 carbon atoms and wherein there is no hydroxy group on the carbon atom of said hydroxyalkyl group which is attached to the nitrogen atom.

5. The anthraquinone dye compound having the formula:

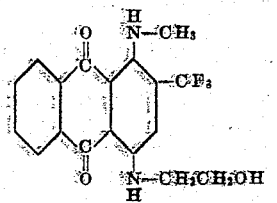

JOSEPH B. DICKEY.
EDMUND B. TOWNE.

REFERENCES CITED

The following references are of record in the file of this patent:

UNITED STATES PATENTS

| Number | Name | Date |
|---|---|---|
| 2,050,704 | Koeberle et al. | Aug. 11, 1936 |
| 2,061,186 | Cole | Nov. 17, 1936 |

FOREIGN PATENTS

| Number | Country | Date |
|---|---|---|
| 254,450 | Germany | Dec. 3, 1912 |
| 713,745 | Germany | Oct. 23, 1941 |